United States Patent
Inoue et al.

(10) Patent No.: US 11,541,556 B2
(45) Date of Patent: Jan. 3, 2023

(54) ROBOT WRIST STRUCTURE

(71) Applicant: FANUC CORPORATION, Yamanashi (JP)

(72) Inventors: Toshihiko Inoue, Yamanashi (JP); Shunsuke Abiko, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 41 days.

(21) Appl. No.: 16/445,617

(22) Filed: Jun. 19, 2019

(65) Prior Publication Data

US 2020/0009747 A1 Jan. 9, 2020

(30) Foreign Application Priority Data

Jul. 4, 2018 (JP) .............................. JP2018-127259

(51) Int. Cl.
  *B25J 17/02* (2006.01)
  *B25J 9/10* (2006.01)
  B25J 9/02 (2006.01)
  B25J 19/00 (2006.01)

(52) U.S. Cl.
  CPC ........... *B25J 17/0283* (2013.01); *B25J 9/102* (2013.01); *B25J 9/02* (2013.01); *B25J 9/104* (2013.01); *B25J 19/0029* (2013.01)

(58) Field of Classification Search
  CPC .......... B25J 17/0283; B25J 9/102; B25J 9/02; B25J 9/104; B25L 19/0029
  See application file for complete search history.

(56) References Cited

U.S. PATENT DOCUMENTS 5,178,031 A * 1/1993 Orsi ....................... B25J 9/1025
  901/14
5,279,177 A * 1/1994 Inada ................... B25J 19/0029
  901/29

(Continued)

FOREIGN PATENT DOCUMENTS

DE 112012006256 B4 11/2015
DE 10 2014 114 903 A1 4/2016

(Continued)

OTHER PUBLICATIONS

Japanese Office Action dated Jun. 16, 2020, in connection with corresponding JP Application No. 2018-127259 (9 pp., including machine-generated English translation).

(Continued)

*Primary Examiner* — Zakaria Elahmadi
(74) *Attorney, Agent, or Firm* — Maier & Maier, PLLC

(57) ABSTRACT

A robot wrist structure includes a first wrist element that is supported by a forearm in a rotatable manner about a first axis; a second wrist element that is supported by the first wrist element in a rotatable manner about a second axis that is orthogonal to the first axis; and a third wrist element that is supported by the second wrist element in a rotatable manner about a third axis that is orthogonal to the second axis and that is disposed in the same plane as the first axis. Further the second wrist element is provided with, at a position at which the second axis is included, a second axial hollow hole that passes therethrough in a direction along the second axis.

3 Claims, 3 Drawing Sheets

(56) References Cited

U.S. PATENT DOCUMENTS

| | | | |
|---|---|---|---|
| 7,322,258 B2* | 1/2008 | Shiraki | B25J 19/0025 901/28 |
| 8,434,387 B2* | 5/2013 | Nakagiri | B25J 17/0258 74/665 R |
| 8,537,346 B2* | 9/2013 | Nakagiri | B25J 9/1692 356/152.2 |
| 9,481,095 B2* | 11/2016 | Takahashi | B25J 19/0025 |
| 9,517,568 B2* | 12/2016 | Demura | B25J 19/0079 |
| 9,770,831 B2* | 9/2017 | Sakai | B25J 19/0025 |
| D911,407 S * | 2/2021 | Jia | D15/199 |
| 2002/0135334 A1 | 9/2002 | Uematsu et al. | |
| 2003/0192390 A1 | 10/2003 | Uematsu et al. | |
| 2004/0261562 A1* | 12/2004 | Haniya | B25J 17/0283 74/490.02 |
| 2005/0189333 A1* | 9/2005 | Nakagiri | B25J 19/0029 219/125.1 |
| 2008/0034920 A1* | 2/2008 | Inoue | B25J 17/0283 74/665 M |
| 2009/0314120 A1* | 12/2009 | Larsson | B25J 19/0029 74/490.02 |
| 2011/0252915 A1* | 10/2011 | Nakagiri | B25J 19/0029 74/490.02 |
| 2012/0060637 A1* | 3/2012 | Kinoshita | B25J 17/0283 74/490.03 |
| 2012/0111135 A1* | 5/2012 | Ichibangase | B25J 19/0025 74/490.06 |
| 2012/0266712 A1* | 10/2012 | Oka | B25J 17/0283 74/490.05 |
| 2012/0266720 A1* | 10/2012 | Oka | B25J 17/0283 74/665 H |
| 2013/0055842 A1* | 3/2013 | Okada | B25J 9/102 74/490.03 |
| 2013/0319160 A1* | 12/2013 | Oikawa | B25J 9/1025 74/490.06 |
| 2013/0333509 A1* | 12/2013 | Adachi | B25J 9/102 901/29 |
| 2014/0196563 A1* | 7/2014 | Takahashi | B25J 17/02 74/490.06 |
| 2015/0005940 A1* | 1/2015 | Ichibangase | B25J 9/102 700/258 |
| 2015/0059511 A1 | 3/2015 | Mushikami et al. | |
| 2016/0023359 A1* | 1/2016 | Saito | B25J 17/0258 74/490.06 |
| 2016/0101526 A1* | 4/2016 | Saito | H02K 11/215 74/490.06 |
| 2016/0256999 A1 | 9/2016 | Kinoshita et al. | |
| 2017/0274524 A1* | 9/2017 | Inoue | B25J 9/102 |
| 2017/0368697 A1* | 12/2017 | Inoue | B25J 19/0029 |
| 2018/0055584 A1* | 3/2018 | Farritor | A61B 34/30 |
| 2018/0229362 A1 | 8/2018 | Kinoshita et al. | |
| 2018/0333844 A1* | 11/2018 | Inoue | B23K 9/12 |
| 2019/0160694 A1* | 5/2019 | Inoue | B25J 18/00 |
| 2019/0216552 A1* | 7/2019 | Palmowski | B25J 9/126 |
| 2021/0060765 A1 | 3/2021 | Kinoshita et al. | |

FOREIGN PATENT DOCUMENTS

| | | |
|---|---|---|
| EP | 0 502 832 A1 | 9/1992 |
| EP | 0 535 604 A1 | 4/1993 |
| EP | 1243384 A1 | 9/2002 |
| EP | 1886773 A1 | 2/2008 |
| EP | 1352721 B1 | 8/2013 |
| EP | 3064324 A1 | 9/2016 |
| JP | S61-182789 A | 8/1986 |
| JP | S62-48481 A | 3/1987 |
| JP | H02-107481 U | 8/1990 |
| JP | H05-77192 A | 3/1993 |
| JP | H05-29691 U | 4/1993 |
| JP | 2005-014100 A | 1/2005 |
| JP | 2008-44019 A | 2/2008 |
| JP | 4233578 B2 | 3/2009 |
| JP | 2018-001277 A | 1/2018 |

OTHER PUBLICATIONS

Japanese Search Report dated Jun. 5, 2020, in connection with corresponding JP Application No. 2018-127259 (15 pp., including machine-generated English translation).

Office Action dated Feb. 16, 2022, in connection with corresponding German Application No. 102019117252.7 (10 pp., including machine-generated English translation).

* cited by examiner

ROBOT WRIST STRUCTURE

CROSS-REFERENCE TO RELATED APPLICATIONS

This application is based on Japanese Patent Application No. 2018-127259, the contents of which are incorporated herein by reference.

FIELD

The present invention relates to a robot wrist structure.

BACKGROUND

There is a known robot wrist structure provided with: a first wrist element that is attached to a forearm in a rotatable manner about a first axis; a second wrist element that is supported by the first wrist element in a rotatable manner about a second axis, which is perpendicular to the first axis; and a third wrist element that is supported by the second wrist element in a rotatable manner about a third axis, which is disposed in the same plane as the first axis, wherein the forearm is provided with a first hollow portion disposed about the first axis, the first wrist element is provided with a through-hole that passes therethrough along the first axis and that is in communication with the first hollow portion, and the third wrist element is provided with a second hollow portion that passes therethrough along the third axis (for example, see Japanese Unexamined Patent Application, Publication No. 2018-001277).

With this wrist structure, it is possible to wire a wire body from rearward of the forearm to a tip of the third wrist element so as to pass through the first hollow portion, the through-hole, and the second hollow portion. By doing so, there is an advantage in that it is possible to considerably reduce the load exerted to the wire body due to motions of the first, second, and third wrist elements without having to make the wire body longer.

The wiring route that reaches the tip of the third wrist element from rearward of the forearm so as to pass through the first hollow portion, the through-hole, and the second hollow portion is generally utilized as a wiring route for a wire body having relatively high rigidity, such as a welding wire or a high-current cable, that has passed through a relaying apparatus installed in a rear portion of the forearm. Also, in this case, the wire body is wired by being accommodated in a dedicated conduit.

SUMMARY

An aspect of the present invention is a robot wrist structure including: a first wrist element that is supported by a forearm in a rotatable manner about a first axis; a second wrist element that is supported by the first wrist element in a rotatable manner about a second axis that is orthogonal to the first axis; and a third wrist element that is supported by the second wrist element in a rotatable manner about a third axis that is orthogonal to the second axis and that is disposed in the same plane as the first axis, wherein the second wrist element is provided with, at a position at which the second axis is included, a second axial hollow hole that passes therethrough in a direction along the second axis.

In the above-described aspect, the first wrist element may be provided with, at a position at which the first axis is included, a first axial hollow hole that passes therethrough along a direction along the first axis, and the third wrist element may be provided with, at a position at which the third axis is included, a third axial hollow hole that passes therethrough in a direction along the third axis.

In the above-described aspect, two driving motors that respectively drive the second wrist element and the third wrist element may be disposed in the first wrist element, two sets of gear sets that respectively reduce the rotational speed of the individual driving motors may be provided, one of the gear sets may be provided with a driven-side first gear secured to the second wrist element such that the second axis serves as a center axis, the other gear set may be provided with a driven-side second gear that is secured, via a shaft extending in a direction along the second axis, to a driving-side bevel gear that engages with the driven-side bevel gear secured to the third wrist element, and the second axial hollow hole may be provided in the shaft.

In the above-described aspect, the shaft may be integrally formed with the driving-side bevel gear.

DETAILED DESCRIPTION OF EMBODIMENT

A robot wrist structure 1 according to an embodiment of the present invention will be described below with reference to the drawings.

Figure 1:
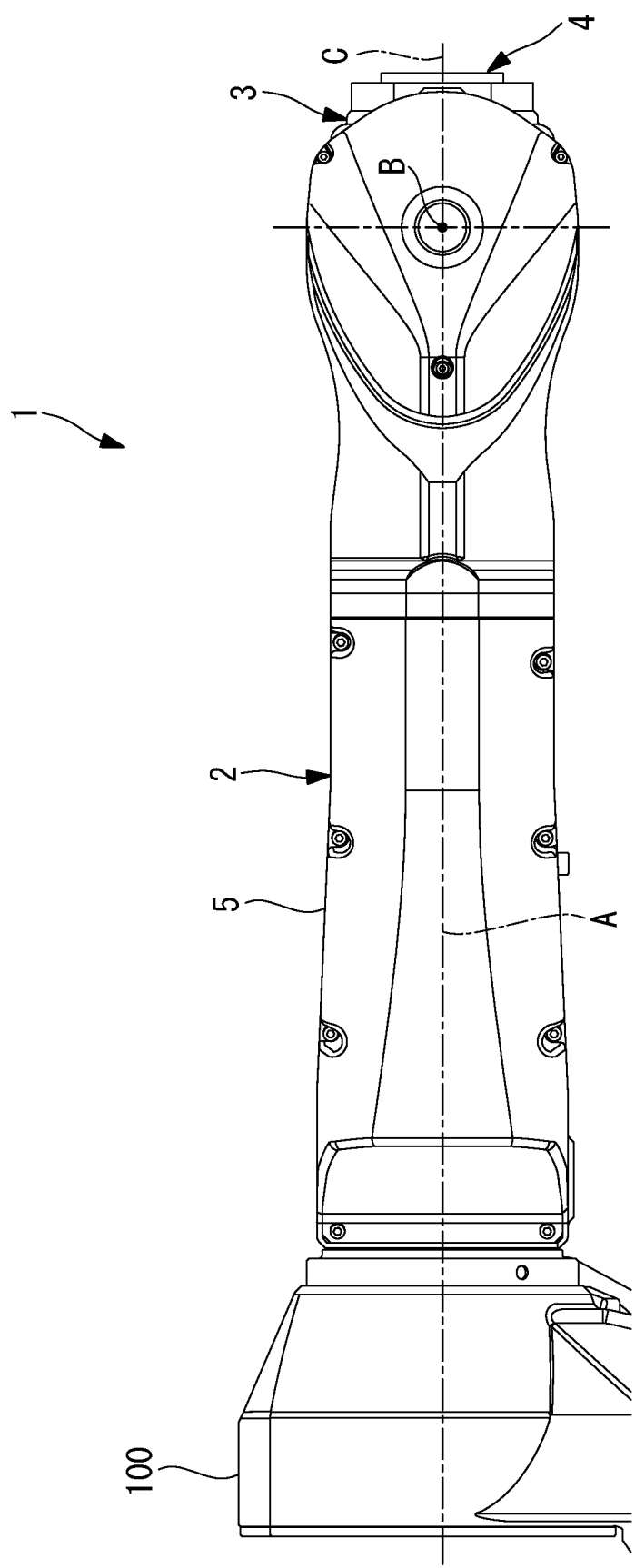
FIG. 1 is a front view showing a robot wrist structure according to an embodiment of the present invention.

As shown in FIG. 1, the robot wrist structure 1 according to this embodiment is a wrist structure that is attached to a robot forearm 100 and is provided with a first wrist element 2, a second wrist element 3, and a third wrist element 4.

The first wrist element 2 is provided with a first wrist casing 5 that is supported by the forearm 100 in a rotatable manner about a first axis A.

The second wrist element 3 is supported by the first wrist element 2 in a rotatable manner about a second axis B that is orthogonal to the first axis A.

The third wrist element 4 is supported by the second wrist element 3 in a rotatable manner about a third axis C that is orthogonal to the second axis B and that is disposed in the same plane as the first axis A.

Figure 2:
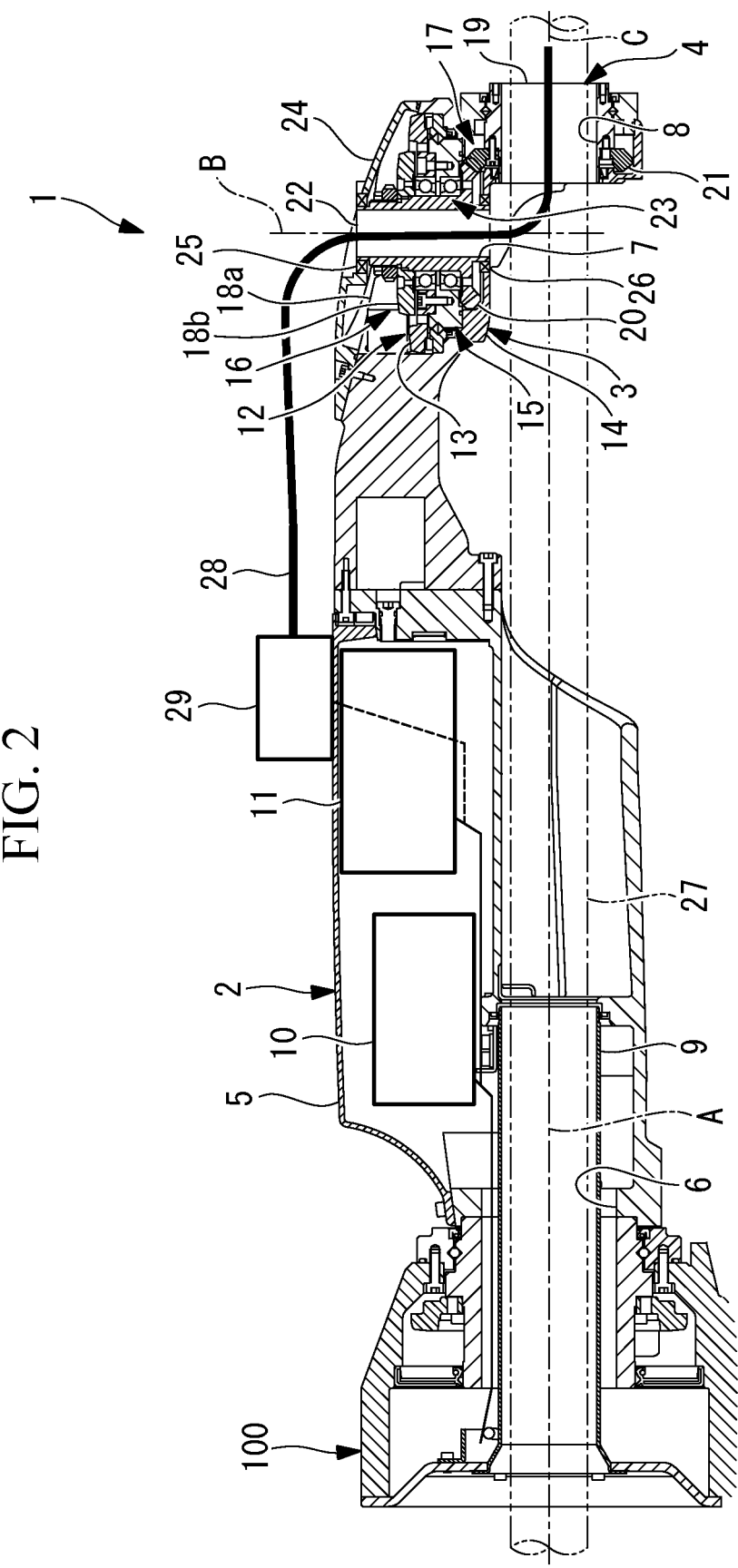
FIG. 2 is a longitudinal cross-sectional view of the wrist structure in FIG. 1.

As shown in FIG. 2, the first wrist casing 5 is provided with, at a position at which the first axis A is included, a first axial hollow hole 6 that passes therethrough from rearward of the forearm 100 in a direction along the first axis A. In the first axial hollow hole 6, a cylindrical guiding pipe 9 that is secured to the forearm 100 and through which a first wire body 27, described later, passes is disposed.

The third wrist element 4 is provided with, at a position at which the third axis C is included, a third axial hollow hole 8 that passes therethrough in a direction along the third axis C.

In this embodiment, as shown in FIG. 2, the second wrist element 3 is provided with, at a position at which the second axis B is included, a second axial hollow hole 7 that passes therethrough in a direction along the second axis B.

The first wrist casing 5 extends in a direction along the first axis A at a position offset in one direction from the first axis A and supports the second wrist element 3 at the tip thereof. In the first wrist casing 5, motors (driving motors)

10 and 11 that rotationally drive the second wrist element 3 and the third wrist element 4 are secured.

Between the motor 10, which rotationally drives the second wrist element 3, and the second wrist element 3, a hypoid gear set (gear set) 12 that reduces the rotational speed of the motor 10 at a predetermined reduction rate is disposed. The hypoid gear set 12 is provided with a pinion gear (not shown) that is rotationally driven by the motor 10 and a ring gear (driven-side first gear) 13 that is secured to the second wrist element 3 and that engages with the pinion gear.

Figure 3:
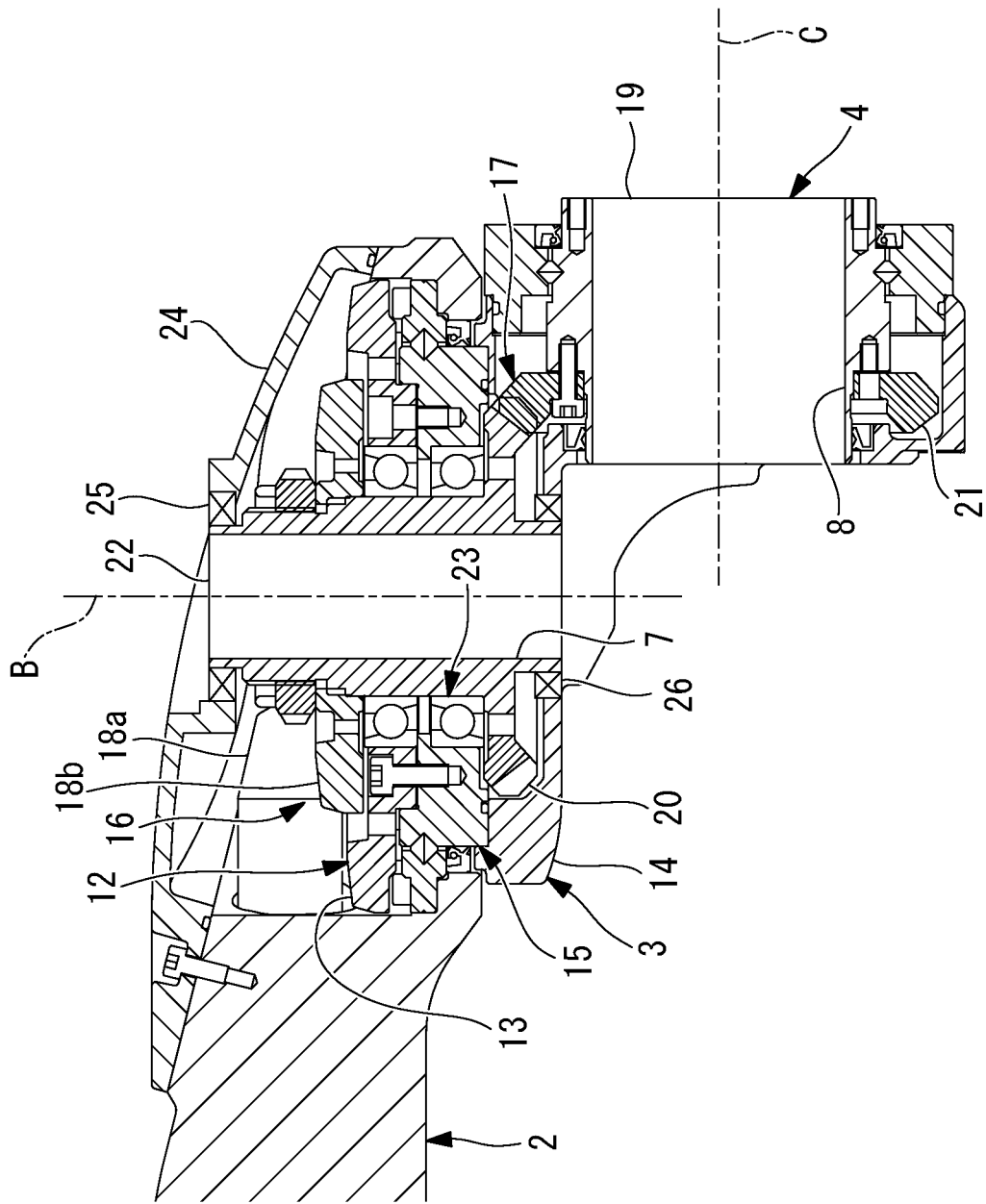
FIG. 3 is an enlarged longitudinal cross-sectional view showing a second wrist element and a third wrist element of the wrist structure in FIG. 1.

Specifically, as shown in FIG. 3, the second wrist element 3 is provided with a second wrist casing 14 and a cross roller bearing 15 in which an outer ring thereof is secured to the first wrist element 2 and an inner ring thereof is secured to the second wrist casing 14. The ring gear 13 of the hypoid gear set 12 is secured to the inner ring of the cross roller bearing 15. By doing so, as a result of rotationally driving the pinion gear by means of the operation of the motor 10, the ring gear 13 engaged with the pinion gear is rotated about the second axis B, and the inner ring of the cross roller bearing 15 to which the ring gear 13 is secured and the second wrist casing 14 secured to the inner ring are consequently rotated about the second axis B.

Between the motor 11, which rotationally drives the third wrist element 4, and the third wrist element 4, a hypoid gear set (gear set) 16 that reduces the rotational speed of the motor 11 at a predetermined reduction rate and a bevel gear set 17 that converts the rotation about the second axis B to the rotation about the third axis C are disposed. This hypoid gear set 16 is also provided with a pinion gear 18a that is rotationally driven by the motor 11 and a ring gear (driven-side second gear) 18b that is secured to the second wrist element 3 and that engages with the pinion gear 18a.

Specifically, as shown in FIG. 3, the third wrist element 4 is provided with a cylindrical third wrist casing 19 that is supported by the second wrist casing 14 in a rotatable manner about the third axis C.

The bevel gear set 17 is provided with a driving-side bevel gear 20 that is supported in a rotatable manner about the second axis B and a driven-side bevel gear 21 that is secured to the third wrist casing 19.

The driving-side bevel gear 20 is integrally formed with a shaft 22 that extends along the second axis B, and is supported by a ball bearing 23 in a rotatable manner about the second axis B with respect to the inner ring of the cross roller bearing 15 of the second wrist element 3. A ring gear 18b is secured to the shaft 22. By machining the inner ring of the cross roller bearing 15 and by directly fitting the inner ring to an outer ring of the ball bearing 23, the number of components is reduced. The number of components is also reduced by integrally forming the driving-side bevel gear 20 with the shaft 22.

In this embodiment, the second axial hollow hole 7 is provided so as to pass through the shaft 22 in the axial direction. As a result of directly fitting the inner ring of the cross roller bearing 15 to the outer ring of the ball bearing 23 that supports the shaft 22 in a rotatable manner, it is possible to ensure that the inner diameter of the ball bearing 23 is sufficiently large by reducing the number of components. By doing so, the outer diameter of the shaft 22 is ensured to be sufficiently large, and the inner diameter of the second axial hollow hole 7 is ensured to be sufficiently large.

In the figure, the reference sign 24 denotes a cover that is provided in the first wrist casing 5, and that closes off a space that accommodates the two hypoid gear sets 12 and 16, the cross roller bearing 15, the ball bearing 23, and the bevel gear set 17. One end of the shaft 22 is disposed so as to pass through the cover 24, and a sealing member 25 that seals off the above-described space is disposed between the one end of the shaft 22 and the cover 24. The other end of the shaft 22 is disposed so as to pass through the second wrist casing 14, and a sealing member 26 that seals off the above-described space is also disposed between the other end of the shaft 22 and the second wrist casing 14.

The operation of the robot wrist structure 1 according to this embodiment, thus configured, will be described below.

With the robot wrist structure 1 according to this embodiment, because the first axial hollow hole 6 provided in the first wrist casing 5 is provided along the first axis A, the first wire body 27, which is indicated by the chain line, provided so as to pass through the first axial hollow hole 6 from rearward of the forearm 100 is not subjected to a large load due to the rotation of the first wrist casing 5 about the first axis A. Because the third axial hollow hole 8 provided in the third wrist casing 19 is provided along the third axis C, the first wire body 27 that passes through the third axial hollow hole 8 is not subjected to a large load due to the rotation of the third wrist casing 19 about the third axis C.

Because the first axis A and the third axis C are always disposed in the same plane and the first wrist casing 5 is offset in one direction with respect to the first axis A, the first wire body 27 that has passed through the first axial hollow hole 6 directly passes through the third axial hollow hole 8 without interfering with the first wrist casing 5, and is connected to a tool (not shown) that is attached to the tip of the third wrist casing 19. Although the first wire body 27 passing through the first axial hollow hole 6 and the third axial hollow hole 8 is subjected to bending at an angle in accordance with the rotational angle of the second wrist element 3 as a result of the second wrist element 3 being rotated about the second axis B, because the second axis B is orthogonal to the first axis A and the third axis C, only a bending force acts on the first wire body 27, and the first wire body 27 is not subjected to a large load.

With the robot wrist structure 1 according to this embodiment, as shown in FIG. 2, because the second wrist element 3 is provided with the second axial hollow hole 7 that passes therethrough along the second axis B, it is possible to provide a second wire body 28 from outside the first wrist casing 5 so as to pass through the second axial hollow hole 7 and the third axial hollow hole 8. As the second wire body 28, a member that is thinner and more flexible than the first wire body 27 passing through the first axial hollow hole 6 is selected. Examples thereof include a cable that transmits weak signals, an air tube that supplies air pressure, and so forth.

With this wiring route, because the second wire body 28 is disposed along the second axis B, with regard to the rotational motion of the second wrist element 3 about the second axis B with respect to the first wrist element 2, the second wire body 28 is not subjected to an excessive load and thus it is possible to maintain a sound state in terms of durability. It is possible to minimize extra lengths provided in the portions of the second wire body 28 that are exposed at both ends of the second axial hollow hole 7, and thus, there is an advantage in that it is possible to make it easy to avoid interference between an external structure in close proximity to the wrist and the second wire body 28.

As has been described above, because the motors 10 and 11 that rotationally drive the second wrist element 3 and the third wrist element 4 are disposed in the first wrist casing 5, wiring to these motors 10 and 11 is provided along a wiring route that passes through the robot interior. Therefore, by providing a wire body to be connected to the second wire body 28 so as to reach a relay box 29 of the first wrist casing 5 along the wiring route passing through the robot interior, a user may wire the second wire body 28 from the relay box 29 to the tool. By doing so, it is possible to further facilitate the work for wiring the second wire body 28.

With this embodiment, because the second axial hollow hole 7 is provided in the shaft 22 that is rotated about the second axis B, it is possible to reduce the weight of the wrist structure 1. Because the two ends of the shaft 22 are sealed off by means of the sealing members 25 and 26 and the second axial hollow hole 7 is isolated from the space in which the hypoid gear sets 12 and 16 and so forth are disposed, it is possible to considerably reduce the quantity of a lubricating material filled in the space. By doing so, it is possible to reduce the quantity of the lubricating material, and to achieve further weight reduction.

As a result, the following aspect is derived from the above described embodiment.

An aspect of the present invention is a robot wrist structure including: a first wrist element that is supported by a forearm in a rotatable manner about a first axis; a second wrist element that is supported by the first wrist element in a rotatable manner about a second axis that is orthogonal to the first axis; and a third wrist element that is supported by the second wrist element in a rotatable manner about a third axis that is orthogonal to the second axis and that is disposed in the same plane as the first axis, wherein the second wrist element is provided with, at a position at which the second axis is included, a second axial hollow hole that passes therethrough in a direction along the second axis.

With this aspect, by rotating the first wrist element about the first axis with respect to the forearm, by rotating the second wrist element about the second axis with respect to the first wrist element, and by rotating the third wrist element about the third axis with respect to the second wrist element, it is possible to set the attitude of a tool or the like attached to the third wrist element to an arbitrary attitude. In this case, it is necessary, in some cases, to install a wire body, such as a cable, an air tube, or the like, in a tool or the like from the first wrist element in a simple manner.

In such a case, it is possible to make the wire body pass through the second axial hollow hole provided at the position in the second wrist element at which the second axis is included. By doing so, regarding the rotational motion of the second wrist element about the second axis with respect to the first wrist element, the wire body passing through the second axial hollow hole is not subjected to an excessive load such as repeated bending motions, and thus, it is possible to maintain a sound state in terms of durability. It is possible to minimize extra lengths provided at the portions of the wire body that are exposed at both ends of the second axial hollow hole, and thus, it is possible to make it easy to avoid interference between the wire body and an external structure in close proximity to the wrist.

In the above-described aspect, the first wrist element may be provided with, at a position at which the first axis is included, a first axial hollow hole that passes therethrough along a direction along the first axis, and the third wrist element may be provided with, at a position at which the third axis is included, a third axial hollow hole that passes therethrough in a direction along the third axis.

With this configuration, with regard to a high-rigidity wire body having a relatively large diameter, it is possible to wire wiring to a tool or the like secured to the third wrist element so as to pass through the first axial hollow hole and the third axial hollow hole from the forearm side.

In the above-described aspect, two driving motors that respectively drive the second wrist element and the third wrist element may be disposed in the first wrist element, two sets of gear sets that respectively reduce the rotational speed of the individual driving motors may be provided, one of the gear sets may be provided with a driven-side first gear secured to the second wrist element such that the second axis serves as a center axis, the other gear set may be provided with a driven-side second gear that is secured, via a shaft extending in a direction along the second axis, to a driving-side bevel gear that engages with the driven-side bevel gear secured to the third wrist element, and the second axial hollow hole may be provided in the shaft.

With this configuration, as a result of operating one of the driving motors, the rotational speed of the driving motor is reduced by one of the gear sets and the second wrist element is rotated about the second axis. As a result of operating the driving motor, the rotational speed of the other driving motor is reduced by the other gear set and the third wrist element is rotated about the third axis.

Specifically, the rotational speed of the one of the driving motors is reduced by one of the gear sets and the driven-side first gear is rotated about the second axis at a high torque. Because the driven-side first gear is secured to the second wrist element, it is possible to rotate the second wrist element at a high torque with respect to the first wrist element.

The rotational speed of the other driving motor is reduced by the other gear set and the driven-side second gear is rotated about the second axis at a high torque. The rotation of the driven-side second gear is transmitted to the driving-side bevel gear via the shaft, and thus, it is possible to rotate the driven-side bevel gear engaged with the driving-side bevel gear and the third wrist element secured to the driven-side bevel gear about the third axis at a high torque with respect to the second wrist element. In this case, as a result of providing the second axial hollow hole in the shaft, it is possible to configure the wiring route for the wire body in a simple manner while ensuring a satisfactory wrist function.

In the above-described aspect, the shaft may be integrally formed with the driving-side bevel gear.

With this configuration, it is possible to reduce the number of components.

REFERENCE SIGNS LIST

1 wrist structure
2 first wrist element
3 second wrist element
4 third wrist element
6 first axial hollow hole
7 second axial hollow hole
8 third axial hollow hole
10 and 11 motor (driving motor)
12, 16 hypoid gear set (gear set)
13 ring gear (driven-side first gear)
18b ring gear (driven-side second gear)
20 driving-side bevel gear
21 driven-side bevel gear
22 shaft
A first axis
B second axis
C third axis
100 forearm

The invention claimed is:

1. A robot wrist structure comprising:

a first wrist element that is supported by a forearm in a rotatable manner about a first axis;

a second wrist element that includes a shaft with a center axis which is a second axis that is orthogonal to the first axis, the second wrist element being supported by the first wrist element in a rotatable manner about the second axis; and a third wrist element that is supported by the second wrist element in a rotatable manner about a third axis that is orthogonal to the second axis and that is disposed in the same plane as the first axis, wherein the second wrist element is provided with a second axial hollow hole that is provided so as to pass through the shaft in a direction of the second axis, wherein the first wrist element is provided with, at a position at which the first axis is included, a first axial hollow hole that passes therethrough along a direction along the first axis, wherein the third wrist element is provided with, at a position at which the third axis is included, a third axial hollow hole that passes therethrough in a direction along the third axis, wherein the first axial hollow hole and the third axial hollow hole are configured to be a part of a wiring route for a first wire body, and wherein the second axial hollow hole and the third axial hollow hole are configured to be a part of a wiring route for a second wire body independent from the first wire body.

2. A robot wrist structure according to claim 1, wherein two driving motors that respectively drive the second wrist element and the third wrist element are disposed in the first wrist element, two sets of gear sets that respectively reduce the rotational speed of the individual driving motors are provided, one of the gear sets is provided with a driven-side first gear secured to the second wrist element such that the second axis serves as a center axis, and the other gear set is provided with a driven-side second gear that is secured, via the shaft, to a driving-side bevel gear that engages with the driven-side bevel gear secured to the third wrist element.

3. A robot wrist structure according to claim 2, wherein the shaft is integrally formed with the driving-side bevel gear.

* * * * *